United States Patent [19]

Wichterle

[11] Patent Number: 4,534,916

[45] Date of Patent: Aug. 13, 1985

[54] METHOD FOR THE PREPARATION OF HYDROPHILIC GELS BY MONOMER CASTING

[75] Inventor: Otto Wichterle, Prague, Czechoslovakia

[73] Assignee: Ceskoslovenska, Prague, Czechoslovakia

[21] Appl. No.: 597,334

[22] Filed: Apr. 6, 1984

[30] Foreign Application Priority Data

Aug. 17, 1983 [CS] Czechoslovakia ............ 6009-83

[51] Int. Cl.$^3$ ............................................. B29D 11/00
[52] U.S. Cl. ....................................... 264/2.1; 264/1.1; 264/2.3; 264/311; 264/331.18; 264/337; 523/106; 525/937
[58] Field of Search ............... 264/1.1, 2.1, 2.3, 311, 264/331.18, 337; 523/106, 108; 524/916; 525/937

[56] References Cited

U.S. PATENT DOCUMENTS

| | | | |
|---|---|---|---|
| 2,542,386 | 2/1951 | Beattie | 264/2.3 |
| 3,171,869 | 3/1965 | Weinberg | 264/2.3 |
| 3,944,637 | 3/1976 | Bond et al. | 264/2.3 |
| 4,146,696 | 3/1979 | Bond et al. | 264/2.3 |
| 4,468,184 | 8/1984 | Rawlings | 264/2.1 |

FOREIGN PATENT DOCUMENTS 1478455  6/1977  United Kingdom ............... 523/106

*Primary Examiner*—James Lowe
*Attorney, Agent, or Firm*—Cushman, Darby & Cushman

[57] ABSTRACT

Hydrogels, e.g. hydrogel contact lens are prepared by casting, preferably spin casting, hydrophilic gels in a plastic mold, preferably polypropylene in the presence of a surface active agent.

19 Claims, No Drawings

METHOD FOR THE PREPARATION OF HYDROPHILIC GELS BY MONOMER CASTING

BACKGROUND OF THE INVENTION

The present invention relates to a method for the preparation of a hydrophilic gel by monomer casting a hydrophilic monomer in a plastic mold employing a surface active agent in the monomer containing mixture employed.

Monomer casting of hydrophilic gels, i.e. of lightly cross-linked copolymers of hydrophilic monomers, has indisputable advantages in comparison to the manufacturing of shaped articles by mechanical processing or nonswollen gels and their subsequent swelling. When glass casting molds were used, it was possible to obtain castings with a perfect surface. However, as soon as casting models made of plastics began to be applied, particularly the molds made from polymeric olefins, e.g. polypropylene, microscopical surface defects often occurred which caused, for example, a weak gray turbidity of cast contact lenses. The microscopical investigation of castings and casting molds revealed that minute parts of gel were torn from the surface of the casting and adhered on the surface of mold. Most probably, grafting of the polymerizing gel on the polymer of the creating mold occurred. The surface of a mold made from a crystalline hydrocarbon was affected by grafting above all in the places of amorphous areas of the olefin polymer, which formed palisade structures on the mold surface and a replica of which was distinguished microscopically on the torn-out parts of the gel. To prevent these defects, it has been recommended to carry out the polymerization at a higher temperature, e.g. at 110°–135° C. Though this defect was removed in this way, another problem occurred because a spontaneous deformation of the molds took place at a temperature above the second-order transition and near the melting temperature of the olefin polymer. This caused serious defects, above all in the optics of cast contact lenses.

SUMMARY OF THE INVENTION

It has now been found that these problems can be solved by including in the hydrophilic monomer composition which is to be cast in a plastic mold a surface active agent which contains in addition to a hydrophobic group predominantly or completely hydrocarbon usually with at least six carbon atoms, preferably a hydrocarbon chain, an ionizable group or a strongly hydrophilic nonionized group. Preferably 0.1 to 3 weight % of the monomer mixture is the surface active agent. After polymerization is complete and the object made of the hydrophilic gel removed from the mold the surface active agent can be readily washed out from the hydrophilic gel with a solvent, e.g. water or a mixture of water and a water-miscible solvent, e.g. aqueous alcohol or aqueous isopropyl alcohol.

Apparently the surface active agent in the monomer mixture is adsorbed at the interface between the plastic mold, e.g. a polypropylene mold, and the strongly polar monomer mixture and acts as an inhibitor to grafting of the polymerizing monomers to the plastic mold.

While the mold is preferably made of polypropylene the process of the invention can be used when polymerizing hydrophilic monomers in molds made of other plastics, e.g. other olefin polymers such as those made of polyethylene, ethylenepropylene copolymer, polyamylene, etc.

While the invention is preferably employed in the manufacture of cast contact lens, especially spin cast (i.e. centrifugally cast) contact lens it is also suitable for preparing other cast hydrophilic gel (hydrogel) objects, e.g. medical devices such as artificial heart valve substitutes, diaphragms and catheters as well as cast articles for non-medical uses, e.g. artificial flower parts, containers for trapped enzymes or fragrances, etc.

Detergents, soaps, various wetting agents, and the like, are advantageously used as the surface active agents. Generally, the compounds, which reduce the surface tension of water to less than one half its normal value even at dilution 1:1000, are preferred.

For example, the following surface active compounds can be used:

1. A salt of triethanolamine and alkylbenzenesulfonic acid, where the alkyl has 12 to 18 carbon atoms, e.g. triethanolamine salt of dodecylbenzenesulfonic acid or the corresponding triethanolamine salt with a mixture of alkylbenzenesulfonic acids having 12 to 18 carbon atoms in the alkyl group),
2. a condensation product of palm-oil fatty acids with diethylene glycol and formaldehyde,
3. an addition product of an alkylphenol with oxirane (ethylene oxide) e.g. p-nonylphenol-ethylene oxide having 20 units of ethylene oxide,
4. sodium oleate, sodium stearate, potassium oleate,
5. triethanolammonium caproate.

The particular surface active agent employed is not particularly critical so long as it has the characteristics pointed out above. Thus there can be used any of the surfactants set forth in Kirk-Othmer, Encyclopedia of Chemical Technology, second edition, Vol. 19 pages 507–593 which meet the abovementioned characteristics. The entire disclosure of the cited portion of Kirk-Othmer is hereby incorporated by reference and relied upon. Attention is directed to the discussion in Kirk-Othmer as to ways of controlling solubility and surface activity.

The polymerization conditions can be varied over a wide range as is well known in the art. Separation of the gel casting from the mold can be effected by conventional techniques.

As indicated above the present invention is particularly useful in centrifugally, polymerization casting of axially symmetrical objects, such as, e.g. hydrophilic gel lenses, artificial heart valve substitutes, etc. As is known in the art such centrifugal casting can be preformed by several techniques.

One such technique utilizes equipment wherein each rotating mold containing the polymerization reactants in the cavity thereof is adapted to rotate around their vertical axis. Rotation of each mold at a specifically determined speed creates a centrifugal force which causes the liquid reactants in the mold to generally assume the shape of the cavity of the mold that is contacted by the reactants. The molds can be grouped in linear array or alternatively can be assembled in carousel arrangement and individually rotated. This technique of operation along with various polymerizable compositions that can be used in the spin casting of various objects are disclosed in U.S. Pat. No. 3,660,545 issued on May 2, 1972. This disclosure is incorporated herein by reference as if set out in full text.

In another technique a rotatable polymerization tube is used which is adapted to receive a plurality of molds seated tightly to one another and each containing polymerizable reactants in the mold cavity. The molds are gravity fed into the upper end of the polymerization tube and free falls through the tube. The exit end of the tube is seated tightly on a revolving member which imparts rotation to the tube. An inert gas is fed upwards through the rotating polymerization tube about the free falling rotating molds.

The manufacture of the cast hydrophilic gels according to the invention comprises employing as the starting monomer system a hydrophilic monoolefinic monomer (i.e. a monoethylenically unsaturated monomer), a polyolefinic (preferably diolefinic) monomer (e.g. a polyethylenically unsaturated compound which functions as a cross-linking agent) in an amount to render the hydrophilic gel formed water insoluble but insufficient to destroy the hydrophilic properties, and the surface active agent, preferably in an amount of 0.1 to 3 weight % of the composition. Obviously mixtures of hydrophilic monoolefinic monomers can be used as well as mixtures of cross-linking agents can be used. Also there can be included other monomers which are copolymerizable with the hydrophilic monomer so long as they are not used in an amount to destroy the requisite hydrophilic gel properties of the cast product. Conventional solvents can also be presented.

The medium comprising the reactants is normally liquid and in the event centrifugal casting is employed should be capable of forming the desired shaped article during the centrifugal casting operation. The article may be opaque, translucent or transparent depending on the ultimate use of the cast article formed. For instance, it is not generally a necessity that diaphragms and artificial heart valve substitutes obtained by the practice of the invention be colorless and transparent. On the other hand as indicated above, for example, it is a requirement that soft hydrophilic contact lenses be fully transparent, of good optical quality, soft and resilient as well as possessing other necessary and desirable characteristics.

If the casting, e.g. centrifugal casting, is utilized in the manufacture of contact lenses they can be symmetrical or asymmetrical; low, medium, or high oxygen permeability or transport-ability. By choosing suitably designed mold cavities or bottoms there can be obtained a wide variety of modified lens shapes, e.g., toric, bifocal, truncated and/or ballasted contact lenses. A wide variety of plastic materials or construction can be employed to fabricate the molds as indicated above. For the preparation of hydrophilic articles such as soft contact lenses a mold fabricated of a thermoplastic hydrocarbon material, preferably polypropylene, is particularly suitable.

The surface of the mold can be pretreated or hydrophilized by known methods if desired.

The liquid cast object, e.g. contact lens, forming mixture as stated includes the surface active agent, hydrophilic monomer and cross-linking means. Particular suitable components include hydrophilic monomers and polyolefinic monomers in an amount to form slightly or moderately cross-linked, three dimensional networks such as those disclosed in U.S. Pat. No. 3,822,089, the entire disclosure of which is hereby incorporated by reference and relied upon. Illustrative hydrophilic monomers include water soluble monoesters of an acrylic acid or methacrylic acid with an alcohol having an esterifiable hydroxyl group and at least one additional hydroxyl group such as the mono- and polyalkylene glycol monoesters of methacrylic acid and acrylic acid, e.g., ethylene glycol monomethacrylate, ethylene glycol monoacrylate, diethylene glycol monomethacrylate, diethylene glycol monoacrylate, propylene glycol monomethylate, dipropylene glycol monoacrylate, and the like; the N-alkyl and N,N-dialkyl substituted acrylamides and methacrylamides such as N-methylacrylamide, N,N-dimethylacrylamide, N-methylmethacrylamide, N,N-dimethylmethacrylamide, and the like; N-vinylpyrrolidone; the alkyl substituted N-vinyl pyrrolidones, e.g., methyl substituted N-vinylpyrrolidone; glycidyl methacrylate; glycidyl acrylate; the unsaturated amines; the alkoxy ethyl acrylates (e.g. methoxyethylacrylate); mixtures thereof; and others known to the art.

As indicated above in the practice of the invention to manufacture hydrophilic gel objects, e.g. contact lenses, there can be included hydrophobic acrylic esters, suitably lower alkyl acrylic esters, preferably wherein the alkyl moiety contains 1-5 carbon atoms, such as methyl acrylate or methacrylate, ethyl acrylate or methacrylate, n-prooyl acrylate or methcrylate, isopropyl acrylate or methacrylate, isobutyl acrylate or methacrylate, n-butyl acrylate or methacrylate, amyl acrylate or mixtures thereof.

Other suitable monomers include the ethylenically unsaturated monocarboxylic acid esters, in particular, the methacrylic and acrylic acid esters of siloxane monomers and polymers with/without a pendant hydroxyl group. These monomers are well documented in the contact lens art; see, for example, U.S. Pat. Nos. 4,139,548; 4,235,985; 4,152,508; 3,808,178; 4,139,692; 4,248,989; and 4,139,513. The disclosure of the foregoing illustrative patents, to the extent intended herein, are incorporated by reference as if set out in full text.

Among the preferred monomeric mixtures are those which contain at least one alkylene glycol monoester of methacrylic acid, especially ethylene glycol monomethacrylate, and at least one cross-linking monomer such as the alkylene glycol diester of methacrylic acid, especially ethylene glycol dimethacrylate. Such mixtures may contain other polymerizable monomers, desirably in minor amounts such as N-vinylpyrrolidone, methyl methacrylate, acrylamide, glycidyl methacrylate, N-methylacrylamide, diethylene glycol monomethacrylate, and others illustrated above.

As pointed out supra the above illustrated monomeric mixtures, including mixtures of hydrophobic and hydrophilic reactants, generally include a minor proportion of di- or higher polyfunctional (e.g. di or higher ethylenically unsaturated) polymerizable compound to cause cross-linking of the polymeric matrix as polymerization or curing proceeds. Examples of such di- or higher polyfunctional species include: divinylbenzene, ethylene glycol diacrylate or methacrylate, propylene glycol diacrylate or methacrylate, and the acrylate or methacrylate esters of the following polyols: triethanolamine, glycerol, pentaerythritol, butylene glycol, diethylene glycol, triethylene glycol, tetraethylene glycol, mannitol, sorbitol and the like. Other cross-linking monomers can be illustrated by N,N-methylene-bis-acrylamide or methacrylamide, sulfonated divinylbenzene, and divinylsulfone.

Additional lens-forming materials, providing they form hydrophilic gels, which are suitable in the fabrication of contact lenses are illustrated by one or more of the following U.S. Pat. Nos.: 2,976,576; 3,220,960; 3,937,680; 3,948,871; 3,949,021; 3,983,083; 3,988,274; 4,018,853; 3,875,211; 3,503,942; 3,532,679; 3,621,079;

3,639,524; 3,700,761; 3,721,657; 3,758,448; 3,772,235; 3,786,034; 3,803,093; 3,816,571; 3,940,207; 3,431,046; 3,542,461; 4,055,378; 4,064,086; and 4,062,627.

The polymerization reaction can be carried out in bulk or with an inert solvent. Suitable solvents include water; organic solvents such as water-soluble lower aliphatic monohydric alcohols, e.g. ethyl alcohol, isopropyl alcohol or methyl alcohol, as well as polyhydric alcohols, e.g., ethylene glycol, propylene glycol, glycerol, diethylene glycol, dioxane, etc.; and mixtures thereof. In general, the solvent comprises a minor amount of the reaction medium, i.e., less than about 50 weight percent.

Polymerization of the cast article, e.g. lens-forming mixture may be carried out with free radical catalysts and/or initiators of the type in common use in vinyl polymerization. Such catalyst species can include the organic peroxides e.g. benzoyl peroxide, the alkyl percarbonates, e.g. ethyl percarbonate, hydroperoxides, e.g. t-butylhydroperoxide, and inorganic materials such as hydrogen peroxide and ammonium, sodium, or potassium persulfate. Polymerization temperatures can vary from about 20° C., and lower, to about 100° C., and higher.

Polymerization of the monomer material can also be effected using, for example, radiation (U.V., X-ray, microwave, or other well-known forms of radiation) (which may cause crosslinking of the forming polymerizate) with/without the presence of well-known initiator(s) and/or catalyst(s).

The shape of a lens blank or other article formed by the casting procedure may be controlled not only by the size and shape of the mold, but also by the amount and nature of the components comprising the lens-forming mixture, by the rotational speed of the mold during polymerization, by the position of the axis of rotation of the mold relative to the direction of gravity, and the like. Tilting the axis of rotation or when the axis of rotation does not pass through the optical center of the (forming) lens, a prism component can be added to the lens.

In the fabrication of contact lenses, the lens-forming material is placed in the mold cavity having an optical concave surface wetted by said material, and then for example can be fed one at a time into the inlet end of a polymerization column. The molds can have a pretreated optical surface to increase its hydrophilicity or wettability in a manner well-known in the art. The speed of rotation of the column (if used) and the molds is then adjusted to cause and/or maintain radially outward displacement of the lens-forming mixture to a predetermined lens configuration which when subjected to the polymerization conditions employed in the column will form the desired shaped contact lens. Rotational speed of, for example, 300 r.p.m., and lower to 600 r.p.m., and higher, can be conveniently used. The precise rotational speed to employ in the operation is, of course, well within the skill of the artisan. Factors to be considered include the type and concentration of the components comprising the lens-forming material employed, the operative conditions of choice, the type and concentration of catalyst, initiator, and/or radiation energy source, and factors discussed previously and readily apparent to the artisan.

The composition employed can comprise, consist essentially of or consist of the essential materials set forth above and the steps of the process can comprise, consist essentially of or consists of the stated steps.

Unless otherwise indicated all parts and percentages are by weight.

DETAILED DESCRIPTION

A safe separation of a hydrophilic gel casting from a mold is achieved according to the invention even in low-temperature polymerization processes, e.g. in photopolymerization.

The invention is further illustrated by the following examples of performance.

EXAMPLE 1

A mixture of 100 parts by weight of 2-hydroxyethyl methacrylate, 0.9 parts triethylene glycol dimethacrylate, 1% of (1) a salt of triethanolamine and a 12–18 carbon atoms alkylbenzenesulfonic acid, (2) a condensation product of palm oil fatty acids, diethylene glycol and formaldehyde and (3) an addition product of an alkylphenol with ethylene oxide (having—carbon atoms in the alkyl group and—ethylene oxide units) and 0.4 part of benzoin ethyl ether (polymerization initiator) was polymerized in a closed mold for casting contact lenses, the mold being made from low-pressure polyethylene, at 25° C. under irradiation with a 100-W mercury lamp from the distance of 100 mm through a filter made from a 3 mm thick dethermal glass. After 10 minutes, the mold was opened and a xerogel contact lens was removed and subjected to the usual processing by mechanical adaptation of edges, swelling with water, washing with 50% aqueous isopropyl alcohol, and finally with physiological saline. Preferably clear lenses were obtained in this way.

EXAMPLE 2

A mixture containing 70 parts of 2-hydroxyethyl methacrylate, 29 parts 2-(2-hydroxyethoxy)ethyl methacrylate, 0.3 parts ethylene dimethacrylate, 1 part of a 10% aqueous solution of ammonium peroxydisulfate and 40 parts of a 1% glycerol solution of sodium oleate was employed for the manufacturing of contact lenses by centrifugal casting in polypropylene molds at a polymerization temperature of 75° C. The castings were removed from the polypropylene molds by swelling in water, which lead to a spontaneous separation of the lenses from the molds. The lenses were further processed in the usual way with perfect results as in Example 1.

EXAMPLE 3

The procedure of Example 1 was repeated using a polypropylene mold and employing as the inhibiter of grafting a commercial preparation "Sampson UNIVERSAL" (Shampoo) produced by Druchener Prague. It is a brownish sirupy liquid and is added to the monomer mixture in an amount of 1%. The polymerization proceeds regularly even with higher additions of the surface active agent, e.g. 4%, but at the 4% level the lenses formed are slightly turbid in their bulk.

The composition of the Shampoo is as follows:

12% of Abezon (98% paste of the triethanolamine salt of $C_{12}$–$C_{18}$ alkylbenzene sulfonic acid produced by "Spolek pro chemickou vyrobu", Usti nud Labem.

12% of KDF-16 (the condensation product of coconut fatty acids and diethylene glycol with formaldehyde, 80% of active substance); produced by "Tukove zavody", Lovosice.

1.5% of Slovasol 909 (the addition product of oxirane (ethylene oxide) and alkylphenol); produced by "Chemicke zavody", Novaky.

0.9% of Syntron (sodium ethylenediamine tetracetate); produced by "Luceben zavody", Kolin.

The balance is water and insert material.

Illustrative other polymerizable mixture to which 1% based on the total weight of the mixture of a surfactant, e.g. as set forth in Example 1, 2 or 3 above can be added to make a "soft" contact lens by casting in a mold of polypropylene or other polymeric hydrocarbon according to the invention include the following:

| Composition A | |
|---|---|
| 2-hydroxyethyl methacrylate | 84.6 parts |
| ethylene glycol dimethacrylate | 1.0 part |
| benzoin methyl ether (initiator) | 0.2 part |
| glycerol | 14.2 parts |
| Composition B | |
| 2-hydroxyethyl methacrylate | 78 parts |
| methacrylic acid | 2 parts |
| isopropyl percarbonate | 0.4 part |
| glycerol | 19 parts |
| ethylene glycol dimethacrylate | 1.0 part |
| Composition C | |
| 2-hydroxyethyl methacrylate | 95 parts |
| methyl methacrylate | 5 parts |
| benzoin methyl ether | 0.2 part |
| propylene glycol | 10 parts |
| ethylene glycol dimethacrylate | 0.5 part |

What is claimed is:

1. In a process of preparing a hydrophilic gel article by monomer cast polymerization of a mixture containing a monoolefinic hydrophilic monomer in a plastic mold the improvement comprising including in the polymerizable monomer mixture a surface active agent in an amount effective to prevent grafting of the hydrophilic gel on the plastic mold.

2. A process according to claim 1 wherein the article is a hydrophilic contact lens.

3. A process according to claim 2 wherein the casting is centrifugal casting.

4. A process according to claim 1 wherein the casting is centrifugal casting.

5. A process according to claim 1 wherein the plastic mold is made of a hydrocarbon polymer.

6. A process according to claim 5 wherein the plastic mold is made of polyethylene or polypropylene.

7. A process according to claim 6 wherein there is employed up to 4 weight % of the surface active agent.

8. A process according to claim 7 wherein there is employed 0.1 to 3 weight % of the surface active agent.

9. A process according to claim 8 wherein the surface active agent has a hydrophobic predominantly hydrocarbon or completely hydrocarbon chain and either an ionizable group or a strongly hydrophilic nonionizable group.

10. A process according to claim 9 wherein the hydrophobic chain is a hydrocarbon chain having at least 6 carbon atoms.

11. A process according to claim 10 wherein the plastic mold is made of a hydrocarbon polymer.

12. A process according to claim 2 wherein the mold is made of a hydrocarbon polymer.

13. A process according to claim 12 wherein the mold is made of polyethylene or polypropylene.

14. A process according to claim 13 wherein there is employed 0.1 to 3 weight % of the surface active agent.

15. A process according to claim 14 wherein the surface active agent has at least 6 carbon atoms and either an ionizable group or a strongly hydrophilic nonionizable group.

16. A process according to claim 12 wherein there is employed 0.1 to 3 weight % of the surface active agent and the surface active agent has at least 6 carbon atoms and either an ionizable group or a strongly hydrophilic nonionizable group.

17. A process according to claim 16 wherein the hydrophilic monomer is a mono or polyalkylene glycol monoester of acrylic acid or methacrylic acid.

18. A process according to claim 17 wherein the polymerizable mixture includes a di or higher polyfunctional monomer in an amount effective to form a cross-linked hydrophilic gel.

19. A process according to claim 18 wherein the cross-linking agent is an alkylene glycol or polyalkylene glycol diacrylate or dimethacrylate.

* * * * *